Patented May 19, 1942

2,283,817

UNITED STATES PATENT OFFICE 2,283,817

DETOXICANT

Gustav J. Martin, Elmhurst, and Marvin R. Thompson, Great Neck, N. Y., assignors to William R. Warner & Company, Inc., New York, N. Y., a corporation of Delaware No Drawing. Application May 24, 1941, Serial No. 394,996

19 Claims. (Cl. 167—55)

This invention relates to detoxicants and more particularly relates to preparations for decreasing the harmful effects of a large group of toxic substances, including many drugs used in therapeutics.

This application is a continuation-in-part of our application Serial No. 329,298, filed April 12, 1940.

It is known that when toxic substances or poisons are introduced into or formed in the animal body, the defense mechanism of the body attempts to detoxify the poisonous or toxic substances. The detoxication mechanisms of the body include oxidation, reduction, or conjugation with other substances to render toxic substances less harmful to the body.

In attacking poisons in the manner described, animal bodies use substances which may be termed detoxicants. The animal body, in some instances, has the ability to synthesize substances which serve as detoxicants for certain types of poisons or toxins. Usually these synthesized substances are present only in a limited quantity. Other detoxicants may be supplied to the body through ingestion. Other substances which would have beneficial effects in the detoxication of poisons normally are not present in the body at all or are not present in such quantity or form to aid effectively in the detoxication of many poisons or toxic substances.

We have discovered that certain harmless or nontoxic preparations are capable of supplementing or overcoming bodily deficiencies with respect to certain types of detoxicants and thus are highly beneficial in the detoxication of a great number of poisons.

An object of the invention, therefore, is to provide preparations suitable for furnishing the body with the substances required in the processes of detoxication.

Another object of the invention is to provide preparations adapted for parenteral, oral or rectal administration in cases where inadequate supplies of the raw materials for detoxicants exist, and to reinforce and speed up the processes of detoxication in cases where such deficiencies do not exist.

A further object of our invention is to provide a single preparation that is suitable for achieving an optimum detoxification of a wide and diverse variety of poisons.

In accordance with the present invention, we have provided preparations which are suitable for the detoxication of widely varied poisons or toxic substances. These preparations comprise a plurality of substances which coact with each other and/or with the body in such a manner as to detoxify poisonous substances of a wide variety of types and kinds so that only a single preparation is needed for combating substantially any poison; and in the detoxication of most poisons or toxic substances, they also coact so as to obtain a detoxifying action of a nature or amount that cannot be obtained by any one of the substances when used alone as a detoxicant.

More particularly, such a preparation contains at least one compound from each of the following groups:

(a) Cysteine or cystine, or salts of the same, such as cystine hydrochloride, cysteine hydrochloride or hydro-sulfate, sodium, potassium, magnesium, or calcium cysteinate or cystinate; example, calcium, sodium, potassium or (b) Glucuronic acid or its salts, such as for magnesium glucuronate, or other uronic acids or salts of the same, particularly the hexuronic acids such as galacturonic acid;

(c) Glycine or its salts, such as glycine hydrochloride or hydro-sulfate, and alkali metal or alkaline earth metal glycinates, and glutamine and glutaminates.

The combination of a compound from each of the above groups provides a detoxicant that may be administered in a wide variety of cases of poisoning with the realization that beneficial results will be obtained.

To the above groups of compounds may also be added a compound selected from any or all of the following groups:

(d) Ascorbic acid, its isomers, and their salts, for example, sodium, potassium, magnesium and calcium ascorbate;

(e) Choline, its salts (such as chloride), precursors (such as lecithin), or any compound yielding labile methyl groups during metabolism.

(f) Nicotinic acid and pyrazine mono- or dicarboxylic acids.

In most instances, ascorbic acid or its equivalents when included in the composition gives somewhat more satisfactory results than are obtained by the combination of the compounds from the first three groups. In many types of poisons this component of the composition may be omitted without materially diminishing the protection, but a higher degree of detoxication is usually provided by all of the above indicated coacting components.

The detoxifying action of the preparation is further enhanced in most instances by the addition thereto of choline or its salts.

Nicotinic acid in many instances also further improves the detoxication.

If desired, methionine or its salts may be substituted for both choline and cysteine or cystine in the preparation. It appears that methionine includes the part of the cysteine or cystine molecule which is responsibe for the detoxifying action and also the part of the choline molecule that achieves the detoxication. Both methionine and cysteine are sulfur-containing amino acids and both methionine and choline are labile methyl-containing organic nitrogen compounds. It appears that the sulfur-containing group and the labile methyl groups are the important detoxifying groups.

In view of the foregoing disclosure it will be apparent that our preparation will contain:

(1) A sulfur-containing amino acid selected from the group consisting of cystine, cysteine, methionine, and their salts,
(2) A uronic acid, particularly a hexuronic acid such as glucuronic, galacteuronic, or their salts,
(3) Glycine or glutamine and their salts, to which may be added one or more of the following
(4) An ascorbic acid or salt therof,
(5) A labile methyl-containing organic nitrogen compound selected from the group consisting of choline* and methionine**

\* Used only if the compound selected from group 1 is cysteine or cystine.
\*\* If methionine is the compound selected from group 1, group 5 may be omitted entirely.

and their soluble salts,
(6) A nitrogen-containing heterocyclic carboxylic acid selected from the group consisting of nicotinic acid and pyrazine mono- and dicarboxylic acids.

Because glycine is promptly utilized for protein synthesis, without storage per se, the quantity of glycine normally available for detoxication in the body is definite and limited. Inasmuch as the rate of formation of conjucation products is proportional to the amount of glycine that is available simultaneously with the poison, very little detoxication is produced unless additional glycine is supplied to the body while the toxins are in the circulation. Glycine, being in the nature of a food, can be ingested in substantially any desired amount. Glutamine may be substituted in some cases for glycine, although they are not identical in their action. Glucuronic acid or its water soluble salts acts in some measure in a manner similar to glycine. It also has an unlimited capacity for detoxication after the supply of glycine has been exhausted. The body has definite limitations in its ability to synthesize glucuronic acid.

Cysteine, cystine, methionine and choline cannot be synthesized by the body, and as a consequence for adequate detoxication it is imperative that methionine, cystine or cysteine, or cysteine and choline, or cystine and choline be supplied in adequate amounts.

Laboratory tests upon mice, rats, rabbits, dogs, cats, and humans, and involving the use of over 30,000 test subjects, have been conducted utilizing a wide variety of poisons or toxic substances alone, poisons or toxins with the preparations of the invention, and poisons or toxins with one or more of the individual ingredients of the preparation. In nearly every instance, a definitely superior action has been obtained by the use of the preparation of the invention, thereby definitely establishing the coaction of the several ingredients.

As illustrative of the scope of our work and the results obtained with a typical form of our preparation consisting of equal parts of glycine, cystine, calcium glucuronate and ascorbic acid, the following Table I embraces typical experiments:

I

ILLUSTRATIVE EXAMPLES OF A DETOXIFYING STUDY (All animals on adequate diet)

| Toxic substance | Number of type animals | Mortality without our detoxicant | Mortality with our detoxicant | Difference |
|---|---|---|---|---|
| | | Percent | Percent | Percent |
| Sulfanilamide | 400 mice | 42 | 20 | 22 |
| Sulfanilamide | 200 mice | 27 | 0 | 27 |
| Sulfanilamide | 100 mice | 23 | 0 | 23 |
| Sodium sulfapyridine | 500 mice | 64 | 6 | 58 |
| Atophan | 250 mice | 68 | 40 | 28 |
| Phenacetin | 500 mice | 76 | 17 | 59 |
| Guanidine | 150 mice | 40 | 5 | 35 |
| Nicotine | 30 rats | 100% spasm | No symptoms | 100 |
| Nicotine | 6 rabbits | 100% spasm | No symptoms | 100 |
| Phenylhydrazine | 100 rats | 40 | 19 | 21 |
| Benzene | 50 rats | 20 | 0 | 20 |
| Arsenic | 100 rats | 65 | 15 | 50 |
| Mercury | 30 rats | 40 | 12 | 28 |
| Lead | 50 rats | 60 | 20 | 40 |

The effects of the components of our preparation selected from the first three groups and the individual components thereof in the detoxication of sulfanilamide are illustrated in Tables II and III:

II

| Compound | Solution— | | | | |
|---|---|---|---|---|---|
| | #1 | #2 | #3 | #4 | #5 |
| Sulfanilamide grams | 5.0 | 5.0 | 5.0 | 5.0 | 5.0 |
| Tragacanth do | 0.25 | 0.25 | 0.25 | 0.25 | 0.25 |
| Glycine do | | | 1.0 | | 1.0 |
| Cystine do | | | | 1.0 | 1.0 |
| Calcium glucuronate do | | | | 1.0 | 1.0 |
| Volume cc | 50 | 50 | 50 | 50 | 50 |

III

| | Solution— | | | | |
|---|---|---|---|---|---|
| | #1 | #2 | #3 | #4 | #5 |
| Cage No | 1 | 2 | 3 | 4 | 5 |
| Number of mice | 50 | 50 | 50 | 50 | 50 |
| Weight of each mouse grams | 18 | 18 | 18 | 20 | 18 |
| Weight of dose of sulfanilamide mg | 72 | 72 | 72 | 80 | 72 |
| Dose cc | 0.72 | 0.72 | 0.72 | 0.80 | 0.72 |
| Number mice dead | 21 | 16 | 18 | 14 | 5 |
| Percentage dead | 42 | 32 | 36 | 28 | 10 |
| Percentage saved by detoxicant | | 10 | 6 | 14 | 32 |

The effects of the components selected from the first four groups (glycine, cystine, calcium glucuronate and ascorbic acid) in the detoxication of sulfanilamide and sulfapyridine is illustrated in Table IV.

IV

ILLUSTRATIVE DETOXIFYING EFFECTS OF DETOXICANT ON SULFANILAMIDE AND SULFAPYRIDINE IN MICE INFECTED WITH STREPTOCOCCUS HEMOLYTICUS

|  | Total number of mice | Controls | | Sulfanilamide | | Sulfanilamide and our detoxicant | | Sulfapyridine and our detoxicant | | Our detoxicant | | Difference between sulfanilamide and sulfanilamide and our detoxicant |
|---|---|---|---|---|---|---|---|---|---|---|---|---|
|  |  | Number mice | Deaths | Number mice | Deaths | Number mice | Deaths | Number mice | Deaths | Number mice | Deaths |  |
|  |  |  | Percent |  | Percent |  | Percent |  | Percent |  | Percent | Percent |
| A | 550 | 125 | 96.7 | 125 | 68 | 150 | 54.6 |  |  | 150 | 93.3 | 13.4 |
| B | 200 | 50 | 100 | 50 | 82 | 50 | 68 |  |  | 50 | 100 | 14 |
| C | 225 | 25 | 88 | 100 | 67 | 100 | 52 |  |  |  |  | 15 |
| D | 175 | 25 | 76 | 75 | 24 | 75 | 8 |  |  |  |  | 16 |
| E | 197 | 48 | 98 |  |  | 49 | 24 | 50 | 28 | 50 | 98 |  |
| Total number of mice | 1,347 | 273 |  | 350 |  | 424 |  | 50 |  | 250 |  |  |

The effects of a detoxicant containing glycine, cystine, calcium glucuronate and ascorbic acid as compared with the individual components is shown in Tables V and VI.

V

| Compound | Solution— | | | | | |
|---|---|---|---|---|---|---|
|  | #1 | #2 | #3 | #4 | #5 | #6 |
| Guanidine acetate____grams__ | 1.25 | 1.25 | 1.25 | 1.25 | 1.25 | 1.25 |
| Tragacanth_____do____ | 0.25 | 0.25 | 0.25 | 0.25 | 0.25 | 0.25 |
| Glycine_____do____ |  | 0.5 |  |  |  | 0.5 |
| Cystine_____do____ |  |  | 0.5 |  |  | 0.5 |
| Calcium glucuronate_do____ |  |  |  | 0.5 |  | 0.5 |
| Ascorbic acid_____do____ |  |  |  |  | 0.5 | 0.5 |
| Volume_____cc__ | 25.0 | 25.0 | 25.0 | 25.0 | 25.0 | 25.0 |

VI

|  | Solution— | | | | | |
|---|---|---|---|---|---|---|
|  | #1 | #2 | #3 | #4 | #5 | #6 |
| Cage No. | 1 | 2 | 3 | 4 | 5 | 6 |
| Number mice | 25 | 25 | 25 | 25 | 25 | 25 |
| Weight of each mouse grams | 20 | 20 | 20 | 20 | 20 | 20 |
| Weight of dose of guanidine acetate_____mg__ | 12.0 | 12.0 | 12.0 | 12.0 | 12.0 | 12.0 |
| Dose_____cc__ | 0.24 | 0.24 | 0.24 | 0.24 | 0.24 | 0.24 |
| Number mice dead | 14 | 14 | 10 | 12 | 13 | 2 |
| Percentage dead | 56 | 56 | 40 | 48 | 52 | 8 |
| Percentage saved by detoxicant |  | 00 | 16 | 8 | 4 | 48 |

The effect of the addition of choline to the preparation in the detoxication of Pyramidon and sodium sulfathiazole is shown in Tables VII and VIII.

VII

| Compound | Solution— | | | | | |
|---|---|---|---|---|---|---|
|  | #1 | #2 | #3 | #4 | #5 | #6 |
| Pyramidon_____grams__ | 2.5 | 2.5 | 2.5 |  |  |  |
| Gum tragacanth____do____ | 0.25 | 0.25 | 0.25 | 0.25 | 0.25 | 0.25 |
| Glycine_____do____ |  | 1.0 | 1.0 |  | 1.0 | 1.0 |
| Calcium glucuronate_do____ |  | 1.0 | 1.0 |  | 1.0 | 1.0 |
| Cystine_____do____ |  | 1.0 | 1.0 |  | 1.0 | 1.0 |
| Ascorbic acid_____do____ |  | 1.0 | 1.0 |  | 1.0 | 1.0 |
| Choline_____do____ |  |  | 1.0 |  |  | 1.0 |
| Sucrose_____do____ | 4.5 |  |  | 5.0 |  |  |
| Sodium sulfathiazole_do____ |  |  |  | 5.0 | 5.0 | 5.0 |
| Volume_____cc__ | 50.0 | 50.0 | 50.0 | 50.0 | 50.0 | 50.0 |

VIII

|  | Solution— | | | | | |
|---|---|---|---|---|---|---|
|  | #1 | #2 | #3 | #4 | #5 | #6 |
| Number mice | 50 | 50 | 50 | 50 | 50 | 50 |
| Weight of each mouse grams | 18 | 20 | 20 | 18 | 18 | 18 |
| Weight of each dose of poison_____mg__ | 10.8 | 12.0 | 12.0 | 54.0 | 54.0 | 54.0 |
| Number mice dead | 13 | 7 | 5 | 24 | 2 | 0 |
| Percentage dead | 26 | 14 | 10 | 48 | 4 | 0 |
| Percentage saved by detoxicant |  | 12 | 16 |  | 44 | 48 |

As illustrative of the action of nicotinic acid in the detoxicant, a preparation containing glycine, cystine, ascorbic acid, calcium glucuronate and nicotinic acid was compared with an otherwise identical preparation not containing the nicotinic acid. The poison used was guanidine acetate and was administered in an amount of 0.6 mg./gram of body weight of the test animal. The number of deaths was decreased 48% by means of the detoxicant not containing nicotinic acid (as shown in Table VI) and the number of deaths was decreased 52% by means of the detoxicant containing nicotinic acid.

It will be understood that the above tables are merely examples of thousands of tests that have been made and are selected merely as illustrative of the action of our detoxicant. They are not intended as any limitation on the scope of the invention nor as indicative in any way of the scope or variety of the tests made by us in our research. Those skilled in the art will understand that duplications of tests will involve variations depending on factors that are beyond control, but the conclusion to be drawn from all of the tests is represented by the examples selected.

The results of the illustrative tests tabulated above substantiate that our preparation is effective in the detoxication of widely varying types of poisons and that the preparation is more effective than any of the individual ingredients, alone, and with most poisons is more effective than the sum of the effects of the principal individual components.

As a result of many more tests of similar character, it has been observed that the actions of the components of our preparation will differ somewhat in their detoxication of various poisons. For example, it has been noted, in some instances, that one component may have no detoxifying action on a certain poison or may even increase its toxicity when used alone, while at the same time our preparation which contains such a component is an excellent detoxicant for the poison. With other poisons, one of the components may be outstanding in its effectiveness when used alone and that component may be nearly as effective as our preparation. These variations from the results tabulated above may be attributed to the fact that certain poisons respond better to detoxication by specific components of our preparation for detoxication while all the other components have a lesser action on that poison. However, our preparation has the advantage that it is effective in the detoxication of all of the wide variety poisons tested, whereas one of the individual components may be effective in the detoxication of only a relatively small number of poisons and in most instances less effective than our preparation for even this small number.

The principal advantage of our preparation is that it may be administered in all cases of poisoning with the knowledge that it will be beneficial. The usefulness of a beneficial preparation of this type in instances where there is insufficient time to determine the cause of the toxic condition, will be apparent.

The proportions of the various constituents of the preparation are not critical inasmuch as there is no definite upper limit other than the inability of the body to assimilate the preparation. In general, the amount of the ingredient of each of the groups is equal, although the relative proportions may vary over wide ranges. Excellent results have been obtained by administering a preparation containing one grain or more per day of one ingredient of each of the groups.

Illustrative examples will be apparent from the above description, but there may be mentioned as a suitable preparation 1 to 10 parts by weight each of cystine or cysteine, glucuronic acid and glycine. Another preparation may contain cystine or cysteine, glucuronic acid, glycine and ascorbic acid.

Another preparation may contain equal parts of cystine or cysteine, glucuronic acid, glycine, and nicotinic acid, to which ascorbic acid may be added also if desired. Similarly, choline may be added to any of the above preparations or methionine may be substituted for cystine or cysteine. The presence of choline or methionine in the preparation improves its effectiveness.

Illustrative of the type of toxic substances and poisons which the preparation combats, are those which include a carboxylic group, such as for example salicylic acid or its derivatives, and phenylacetic acid; toxic substances which include hydroxyl, aldehyde and ketonic groups, such as phenol, cresol, camphor, cyclic terpenes, such as borneol, menthol, thymol, naphthalene, antipyrine, turpentine, oxyquinoline, orthonitrotoluene, and similar substances; aromatic compounds and derivatives of benzene, particularly halogenated benzenes; toxins generated by all forms of bacteria and of more or less unknown or indefinite compositions; and inorganic or organic compounds, including those of heavy metals, such as lead, arsenic, mercury, bismuth, etc., whether used in the treatment of disease (sulfanilamide, sulfapyridine, sulfathiazole, arsphenamine; all of the important anthelmintics, etc.) or encountered industrially.

Examples of the toxic substances against which our preparation has been tested successfully are tetanus, diphtheria, sulfapyridine, sulfanilamide, nicotine, phenylhydrazine, atophan, benzene, guanidine, arsenic, mercury, bismuth, lead, halogenated hydrocarbons, such as carbon tetrachloride, sulfides such as carbon disulfide, putrescine, cadaverine, indole and many others. The significance of these tests is apparent inasmuch as the toxic substances are of widely varied kind, including at least one typical member of all of the most important classes of poisons, and clearly indicate that our preparation may be applied safely and beneficially in substantially all types of poisoning. The preparation has been used successfully in combating such common industrial poisons as carbon tetrachloride, benzene and carbon disulfide which are in common use in cleaning plants and in the rayon and rubber industry, respectively.

Metal poisoning in industry is quite common and here, likewise, our preparation is highly beneficial.

Our detoxicant also finds particular usage in connection with the use of certain specific organic substances such as arsenic, bismuth and mercury compounds in the treatment of syphilis, sulfanilamide in the treatment of streptococcic infections and sulfapyridine and sulfathiazol in the treatment of pneumonia. It is well known that the effect of such specific remedies as Salvarsan, sulfapyridine and sulfanilamide, and anthelmintics such as thymol, santonin, chenopodium, tetrachlorethylene and aspidium, is dependent to a large extent upon the quantity that can be administered. However, this quantity is controlled by the tolerance of the individual to whom these remedies are given. In many instances, a large enough quantity to have a beneficial effect cannot be tolerated by the patient because of the toxicity of the drug. Inasmuch as our detoxicant reduces the toxicity of such substances without decreasing therapeutic effectiveness, it will permit larger and more effective amounts of these specific remedies to be given without poisoning the patient.

It should be understood that our detoxicants, while beneficial to a great extent in the treatment of poisons of substantially all types, will not overcome the effects of poisons when given in unusually large quantities and thus cannot be considered as a complete remedy in all cases where amounts of poisons far above the ordinary lethal doses are assimilated by the body. However, definitely beneficial effects are derived from the use of our detoxicants and in a great many instances, complete protection is obtained through the use of the preparation, even in cases of toxicity approaching lethality.

From the foregoing, it will be apparent that we have provided detoxicant preparations which are beneficial in a wide variety of cases of poisoning. The detoxication of substantially all types of toxins and poisons is thus made possible by means of a single, harmless and conveniently usable preparation. It will be understood, of course, that the examples given above are illustrative and that the proportions of the components thereof may be varied widely. Moreover, the water soluble salts of the component may be used, if desired, inasmuch as they are effective and in many instances are less expensive and more readily available than the components mentioned. For example, glucuronic acid is difficult to prepare but its calcium salt is readily available. Substances capable of yielding the components of the preparation upon introduction into the human or animal body may be used, if desired, for example, esters of ascorbic acid, and various precursors of the compounds named. The art fully understands and recognizes such precursors or other compounds which are full equivalents in their functioning in the body. For example, cysteine is readily obtainable from cystine. A comparison of the formula of cysteine

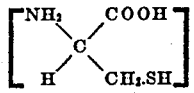

and cystine

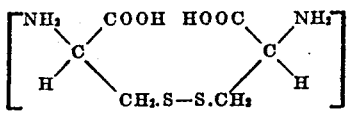

will show that cystine is essentially two molecules of cysteine linked through the mercapto groups, and that cysteine can be readily formed by the body from cystine and vice versa. In fact cysteine is rapidly converted into cystine by oxidation upon exposure to air and cysteine is made by reducing cystine. These two compounds probably exist in admixture or in equilibrium depending on the oxidation-reduction potential. It will be understood, accordingly, that while reference is made in the claims to the various preferred components of our preparation, this is not to be understood as excluding fully recognized equivalents as permitted by law.

We claim:

1. A detoxicant comprising at least one of the group consisting of cysteine, cystine, methionine and their soluble salts; at least one of the group consisting of hexuronic acids and their soluble salts; and at least one of the group consisting of glycine and glutamine and their soluble salts.

2. A detoxicant comprising at least one of the group consisting of cysteine, cystine, methionine and their soluble salts; at least one of the group consisting of hexuronic acids and their soluble salts; at least one of the group consisting of glycine and glutamine and their soluble salts; and at least one of the group consisting of an ascorbic acid and soluble salts thereof.

3. A detoxicant comprising at least one of the group consisting of cysteine, cystine, methionine and their soluble salts; at least one of the group consisting of hexuronic acids and their soluble salts; at least one of the group consisting of glycine and glutamine and their soluble salts; at least one of the group consisting of an ascorbic acid and soluble salts thereof; and at least one of the group consisting of nicotinic acid and pyrazine carboxylic acids.

4. A detoxicant comprising at least one of the group consisting of cysteine, cystine, methionine and their soluble salts; at least one of the group consisting of hexuronic acids and their soluble salts; at least one of the group consisting of glycine and glutamine and their soluble salts; at least one of the group consisting of an ascorbic acid and soluble salts thereof; at least one of the group consisting of nicotinic acid and pyrazine carboxylic acids; and at least one nitrogen-containing compound having a labile methyl radical selected from the group consisting of choline and methionine and their soluble salts.

5. A detoxicant comprising at least one of the group consisting of cysteine, cystine, methionine and their soluble salts; at least one of the group consisting of hexuronic acids and their soluble salts; at least one of the group consisting of glycine and glutamine and their soluble salts; and at least one nitrogen-containing compound having a labile methyl radical selected from the group consisting of choline and methionine and their soluble salts.

6. A detoxicant comprising at least one of the group consisting of cysteine, cystine, methionine and their soluble salts; at least one of the group consisting of hexuronic acids and their soluble salts; at least one of the group consisting of glycine and glutamine and their soluble salts; at least one of the group consisting of an ascorbic acid and soluble salts thereof; and at least one nitrogen-containing compound having a labile methyl radical selected from the group consisting of choline and methionine and their soluble salts.

7. A detoxicant comprising at least one of the group consisting of methionine and its soluble salts; at least one of the group consisting of hexuronic acids and their soluble salts; and at least one of the group consisting of glycine and glutamine and their soluble salts.

8. A detoxicant comprising at least one of the group consisting of methionine and its soluble salts; at least one of the group consisting of hexuronic acids and their soluble salts; at least one of the group consisting of glycine and glutamine and their soluble salts; and at least one of the group consisting of an ascorbic acid and soluble salts thereof.

9. A detoxicant comprising at least one of the group consisting of methionine and its soluble salts; at least one of the group consisting of hexuronic acids and their soluble salts; at least one of the group consisting of glycine and glutamine and their soluble salts; at least one of the group consisting of an ascorbic acid and soluble salts thereof; and at least one of the group consisting of nicotinic acid and pyrazine carboxylic acids.

10. A detoxicant comprised of cystine; at least one of the group consisting of hexuronic acids and their soluble salts; at least one of the group consisting of glycine and glutamine and their soluble salts; and choline and its soluble salts.

11. A detoxicant comprised of cystine, at least one of the group consisting of glucuronic acid and its soluble salts; at least one of the group consisting of glycine and glutamine and their soluble salts; at least one of the group consisting of an ascorbic acid and soluble salts thereof; and choline and its soluble salts.

12. A detoxicant comprising glycine, cystine, and at least one of the group consisting of glucuronic acid and its soluble salts.

13. A detoxicant comprising glycine, cystine, a soluble salt of glucuronic acid, and ascorbic acid.

14. A detoxicant comprising glycine, cystine, a soluble salt of glucuronic acid, ascorbic acid, nicotinic acid, and choline.

15. A detoxicant comprising glycine, cystine, a soluble salt of glucuronic acid, and choline.

16. A detoxicant comprising glycine, cystine, a soluble salt of glucuronic acid, ascorbic acid, and choline.

17. A detoxicant comprising about equal parts by weight of glycine, cystine, and calcium glucuronate.

18. A detoxicant comprising about equal parts by weight of glycine, cystine, calcium glucuronate, and ascorbic acid.

19. A detoxicant comprising about equal parts by weight of glycine, cystine, calcium glucuronate, ascorbic acid, and choline.

GUSTAV J. MARTIN.
MARVIN R. THOMPSON.

CERTIFICATE OF CORRECTION.

Patent No. 2,283,817.                                                     May 19, 1942.

GUSTAV J. MARTIN, ET AL.

It is hereby certified that error appears in the printed specification of the above numbered patent requiring correction as follows: Page 1, second column, line 22, strike out "example, calcium, sodium, potassium or" and insert the same after "for" in line 23; and that the said Letters Patent should be read with this correction therein that the same may conform to the record of the case in the Patent Office.

Signed and sealed this 30th day of June, A. D. 1942.

(Seal)                                                                   Henry Van Arsdale,
                                                                      Acting Commissioner of Patents.